United States Patent
Da Silva et al.

(10) Patent No.: US 10,341,446 B2
(45) Date of Patent: Jul. 2, 2019

(54) SUSPENSION OF LOG MESSAGE TRANSMISSION FROM HOST DEVICE TO TERMINAL DEVICE

(71) Applicant: Lenovo Enterprise Solutions (Singapore) PTE. LTD., New Tech Park (SG)

(72) Inventors: Roberto Henrique Jacob Da Silva, Oak Park, CA (US); Yanyu Chen, WuXi (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 243 days.

(21) Appl. No.: 15/298,707

(22) Filed: Oct. 20, 2016

(65) Prior Publication Data
US 2018/0115621 A1    Apr. 26, 2018

(51) Int. Cl.
   H04L 12/24      (2006.01)
   H04L 29/06      (2006.01)
   H04L 29/08      (2006.01)

(52) U.S. Cl.
   CPC ............ *H04L 67/22* (2013.01); *H04L 41/069* (2013.01); *H04L 41/0813* (2013.01); *H04L 67/14* (2013.01); *H04L 67/38* (2013.01)

(58) Field of Classification Search
   CPC ..... H04L 67/22; H04L 67/38; H04L 41/0816; G06F 3/0233
   See application file for complete search history.

(56) References Cited

U.S. PATENT DOCUMENTS

| | | | | |
|---|---|---|---|---|
| 7,792,036 B2* | 9/2010 | Clemm | ............... | H04L 41/0681 370/235 |
| 8,560,889 B2* | 10/2013 | Behrendt | ................ | G06F 9/542 714/15 |
| 8,789,052 B2* | 7/2014 | Small | .................... | G06F 9/4881 700/100 |
| 2007/0130380 A1* | 6/2007 | Tysowski | .............. | G06F 3/0237 710/15 |
| 2009/0210585 A1* | 8/2009 | Ricci | ..................... | G06F 13/124 710/48 |

OTHER PUBLICATIONS

Cisco, "Catalyst 3560 Switch Software Configuration Guide, Release 15.0(1)SE", https://www.cisco.com/c/en/us/td/docs/switches/lan/catalyst3560/software/release/15-0_1_se/configuration/guide/scg3560.pdf, Apr. 15, 2016 (Year: 2016).*

(Continued)

*Primary Examiner* — Brian Whipple
*Assistant Examiner* — James Ross Hollister
(74) *Attorney, Agent, or Firm* — Jason Friday

(57) ABSTRACT

A host device receives a predetermined combination of keystrokes a predetermined number of times within a predetermined time interval, from a terminal device communicatively connected to the host device. In response to receiving the predetermined combination of keystrokes the predetermined number of times within the predetermined time interval, the host device suspends transmission of log messages from the host device to the terminal device for at least a predetermined length of time.

18 Claims, 4 Drawing Sheets

(56) References Cited

OTHER PUBLICATIONS

"How to stopy Small DDOS attacks (Some basic security advice)", How to . . . , online <http://rockdio.org/ayudatech/how-to-stop-small-ddos-attacks-some-basic-security-advice/> dated Jan. 22, 2010, 7 pp.

"How to use rate limiting in rsyslog?", RSYSLOG, The Rocket-Fast System for Log Processing, online <http://www.rsyslog.com/how-to-use-rate-limiting-in-rsyslog/>, dated Oct. 6, 2010, 8 pp.

"How to stop kernel messages from flooding my console?", SuperUser.com, online <http://superuser.com/questions/351387/how-to-stop-kernel-messages-from-flooding-my-console>, Oct. 27, 2011, 3 pp.

"Three Mile Island Memories", I, Cringely, online <http://www.cringely.com/2009/03/31/three-mile-island-memories/>, dated Mar. 31, 2009, 43 pp.

* cited by examiner

SUSPENSION OF LOG MESSAGE TRANSMISSION FROM HOST DEVICE TO TERMINAL DEVICE

BACKGROUND

Devices like networking and other devices commonly include logging capabilities by which log messages corresponding to events that occur within the devices are generated and transmitted to other devices, like computing devices such as general-purpose computers. For instance, a computing device can be directly connected to a host device using a serial cable to establish a teletype (TTY) management channel between the host device and the computing device. The computing device acts as a console terminal device in such instance, by which the computing device can receive log messages from the host device over the TTY management channel, as well as send configuration change and other commands to the host device over the channel for the host device to perform.

SUMMARY

An example method includes detecting, by a host device, receipt of a predetermined combination of keystrokes a predetermined number of times within a predetermined time interval, from a terminal device communicatively connected to the host device. The method includes, in response to detecting the receipt of the predetermined combination of keystrokes the predetermined number of times within the predetermined time interval, suspending, by the host device, transmission of log messages from the host device to the terminal device for at least a predetermined length of time.

An example host device includes a communication interface to establish a management channel with a terminal device over which the terminal device is to manage the host device. The host device includes a processor, and a non-transitory computer-readable data storage medium storing computer-executable code. The processor executes the code to transmit a log message generated at the host device to the terminal device over the management channel if the log message has a severity greater than a threshold severity, if logging over the management channel is enabled, and if log message transmission over the management channel has not been suspended. The processor executes the code to, in response to receiving the predetermined combination of keystrokes the predetermined number of times within the predetermined interval, suspend the log message transmission over the management channel for at least a predetermined length of time. Enablement and disablement of the logging over the management channel is separately controllable from suspension and resumption of the log message transmission over the management channel An example non-transitory computer-readable data storage medium stores computer-executable code. A host device executes the code to receive a predetermined combination of keystrokes a predetermined number of times within a predetermined time interval, from a terminal device communicatively connected to the host device. The host device executes the code to, in response to receiving the predetermined combination of keystrokes the predetermined number of times within the predetermined time interval, suspend transmission of log messages from the host device to the terminal device for at least a predetermined length of time. The host device executes the code to, after the predetermined length of time has elapsed, further receive of the predetermined combination of keystrokes the predetermined number of times within the predetermined time interval, from the terminal device. The host device executes the code to, in response to further receiving the predetermined combination of keystrokes the predetermined number of times within the predetermined time interval, resume the transmission of log messages from the host device to the terminal device. Until detection of the further receipt of the predetermined combination of keystrokes the predetermined number of times within the predetermined time interval, the transmission of log messages from the host device to the terminal device remains suspended after the predetermined length of time has elapsed.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
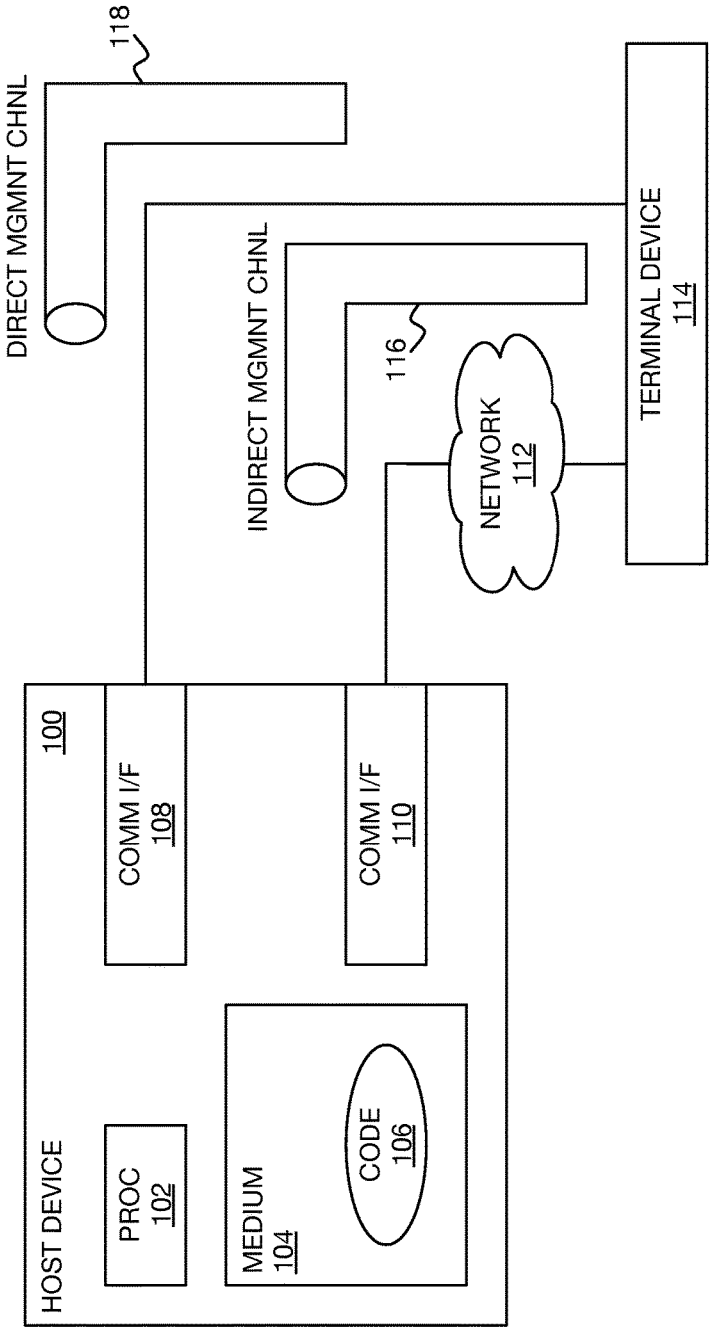
FIG. 1 is a diagram of an example host device having management channels over which log messages are transmitted to a terminal device.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a host device can communicatively connect with a terminal device, like a computing device such as a general-purpose computer, to transmit log messages generated at the host device to the terminal device, and to receive commands from the terminal device to perform at the host device. The terminal device can be or act as a console terminal device, which is in effect a "dumb" terminal that can just simply send text to and receive text from the host device. Such a console terminal device communicatively connects with the host device over a direct communication interface, such as an RS232, RS422, RS423, or RS485 serial connection, in what forms a teletype (TTY) management channel for the host device.

A TTY management channel is generally the lowest form of management channel for a host device. By comparison, another type of management channel is the virtual TTY (VTY) management channel, which is formed on top of a transmission control protocol (TCP)/Internet protocol (IP) connection, using a Telnet protocol, a secure shell (SSH) protocol, and/or a simple network management protocol (SNMP). An advantage of a VTY management channel is that the computing device acting as the terminal device does not have to be located in close physical proximity to the host device, because a VTY management channel is established over an indirect communication interface such as a network interface, like an Ethernet interface, of the host device.

However, a VTY management channel requires that the host device first correctly initialize and run underlying services to provide for the underlying TCP/IP connection, as well as the Telnet protocol, the SSH protocol, and/or the SNMP. If any of these underlying services is not configured correctly, or if the host device is sufficiently inoperable that it cannot even reach the stage of boot-up at which these services are initiated, the VTY management channel is inoperative. In this respect, the TTY management channel remains invaluable, since if the host device is controllable in any way, it will generally be controllable over the TTY management channel.

Communicating over the TTY management channel is not without difficulty, unfortunately. In particular, the TTY management channel, like other management channels such as the VTY management channel, is still susceptible to log message flooding. Specifically, the host device may not be operating properly, may not be configured properly, or may indeed be malfunctioning or faulty, in such a way that it floods the TTY management channel with log messages. Multiple log messages may be sent every second.

Log message flooding is problematic, because when it occurs, such flooding is difficult to stop. In theory the host device is still receptive to commands over the TTY management channel. However, in practice, sending commands to the host device is difficult to achieve. The TTY management channel is a relatively low-bandwidth channel, typically on the order of 9,600 baud. More significantly, it is difficult for a user to type what may be a long and complex configuration command to stop log message flooding while the screen or display of the terminal device is constantly being updated with log messages. For instance, in-between keystrokes entered by the user, multiple log messages may still be received and displayed, even if the user enters the keystrokes quickly. This makes it difficult for the user to see what he or she is typing, and thus difficult for the user to issue a configuration change command, for instance, to stop the flooding of log messages, assuming that the correct configuration change command to issue is even known.

Existing solutions to log message flooding are incomplete at best. Alternative management channels, such as a VTY management channel, which are not currently experiencing log message flooding can be used. However, such alternative management channels may not be configured properly or enabled. Furthermore, the alternative management channels may rely on underlying services that are initiated by the host device after another service that is the source of the problem that is causing the log message flooding. If these underlying services cannot be started, then the alternative management channels that rely on them cannot be used.

Another solution is to simply reboot—i.e., power off and then power back on—the host device. Rebooting a host device that is still providing the services for which it was deployed within a network or other topology, however, is undesirable, even if the device is flooding the TTY management channel with log messages. This is because the network or other topology of which the host device is a part will more than likely suffer a disruption while the host device is rebooted. Furthermore, if the log message flooding is a result of a problematic configuration of the host device, the flooding may start again soon after rebooting. A user may not have enough time to alter the configuration of the host device to prevent the log message flooding from restarting.

The last solution is to replace the image of the host device with a known working image, or otherwise enter a system recovery boot mode of the host device. This solution is quite drastic, and can result in the host device being offline for a lengthy period of time. This solution is further not available to all end users, requiring the host device to be shipped back to a service provider, or requiring service personnel to travel to the location at which the host device has been deployed.

Techniques are disclosed herein that ameliorate these difficulties with log message flooding over a management channel of a host device, such as a TTY management channel in which a terminal device like a computing device is a console terminal device for the host device. A user at the terminal device enters a predetermined combination of keystrokes a predetermined number of times within a predetermined interval. Upon receipt and detection of the predetermined combination of keystrokes the predetermined number of times within the predetermined interval, the host device suspends the transmission of log messages from the host device to the terminal device over the management channel for at least a predetermined length of time.

For example, the keystroke combination may be the holding down of the control key and then depressing the letter C key. Depressing the C key while depressing the control key may have to be performed three times within three seconds. Once the host device detects receipt of the CTRL-C keystroke combination three times within three seconds, the host device suspends transmission of log messages to the terminal device for at least a predetermined length of time, such as sixty seconds. As such, log message flooding is at least temporarily prevented, providing the user with an opportunity to more easily enter a configuration change command at the console terminal device to resolve the underlying issue causing the flooding.

FIG. 1 shows an example host device 100 in which the techniques disclosed herein can be implemented. The host device 100 includes a processor 102 and a non-transitory computer-readable data storage medium 104, which may include a volatile or a non-volatile such medium. The medium 104 stores computer-executable code 106 that the processor 102 executes. The processor 102 may be separate from the computer-readable data storage medium 104, in which case the processor 102 may be a general-purpose processor, for instance. The processor 102 may be integrated with the medium 104, as is the case with an application-specific integrated circuit (ASIC) or a field-programmable gate array (FPGA).

The host device 100 includes communication interfaces 108 and 110. The communication interface 108 is a direct interface, whereas the communication interface 110 is an indirect interface. The communication interface 108 may be a serial interface, for instance, such as an RS-232, RS-422, RS-423, and/or an RS-485 interface. The communication interface 110 may be a network interface, such as a wireless or a wired Ethernet interface, to communicatively connect the host device 100 to a network 112, which may be or include an intranet, an extranet, the Internet, a local-area network (LAN), a wide-area network (WAN), and so on.

The communication interface 108 is a direct interface in that it permits a direct connection to a terminal device 114, such as a general-purpose computing device like a desktop or laptop computer, or even a "dumb" console terminal device on which on just text can be entered and displayed. By comparison, the communication interface 110 is an indirect interface in that it permits an indirection connection to the terminal device 114, via both the host device 100 and the terminal device 114 connecting to the same network 112. A computing device can act as the terminal device 114 to both directly and indirectly connect to the host device 100 at the communication interfaces 108 and 110. By comparison, a "dumb" console terminal device may not have the requisite processing capability, and so on, to connect to the network 112, and as such may just be able to directly connect to the host device 100 at the communication interface 108. Furthermore, one terminal device may connect to the communication interface 108, whereas another, different terminal device may connect (indirectly) to the communication interface 110.

A direct management channel 116 may thus be established between the host device 100 and the terminal device 114 at the communication interface 108, whereas an indirect management channel may be established between the devices 100 and 114 at the communication interface 110. The direct management channel 116 may be a TTY management channel, in which case the terminal device 114 acts as a simple console terminal device even if it is not. The indirect management channel 118 may be a VTY management channel, which can require underlying services running on the host device 100 to provide for the TCP/IP, and the Telnet protocol, the SSH protocol, and/or the SNMP.

Log messages are generated at the host device 100. The log messages may be generated to correspond with events occurring at the host device 100, in configurable levels of granularity. The log messages may pertain to the general health and operating characteristics of the host device 100, such as the amount of memory used, the amount of processing power utilized, the temperature of the device 100, and so on. The log messages may further pertain to the primary functionality for which the host device 100 has been deployed. For example, if the host device 100 is a networking device like a router or switch, then log messages may be generated to indicate what devices have communicatively connected to the or through the device 100, and the data that they are communicating via the device 100.

The management channels 116 and 118 can be separately configured for log messages to be transmitted thereover to the terminal device 114 as the messages are generated at the host device 100. Such configuration may be at a certain threshold level of severity, for instance. For example, all log messages, including informational, warning, and error messages, may be transmitted over the indirect management channel 118, whereas just warning and error messages may be transmitted over the direct management channel 116. In this example, warning log messages are more severe than informational log messages, and error log messages are more severe than warning log messages.

Figure 2:
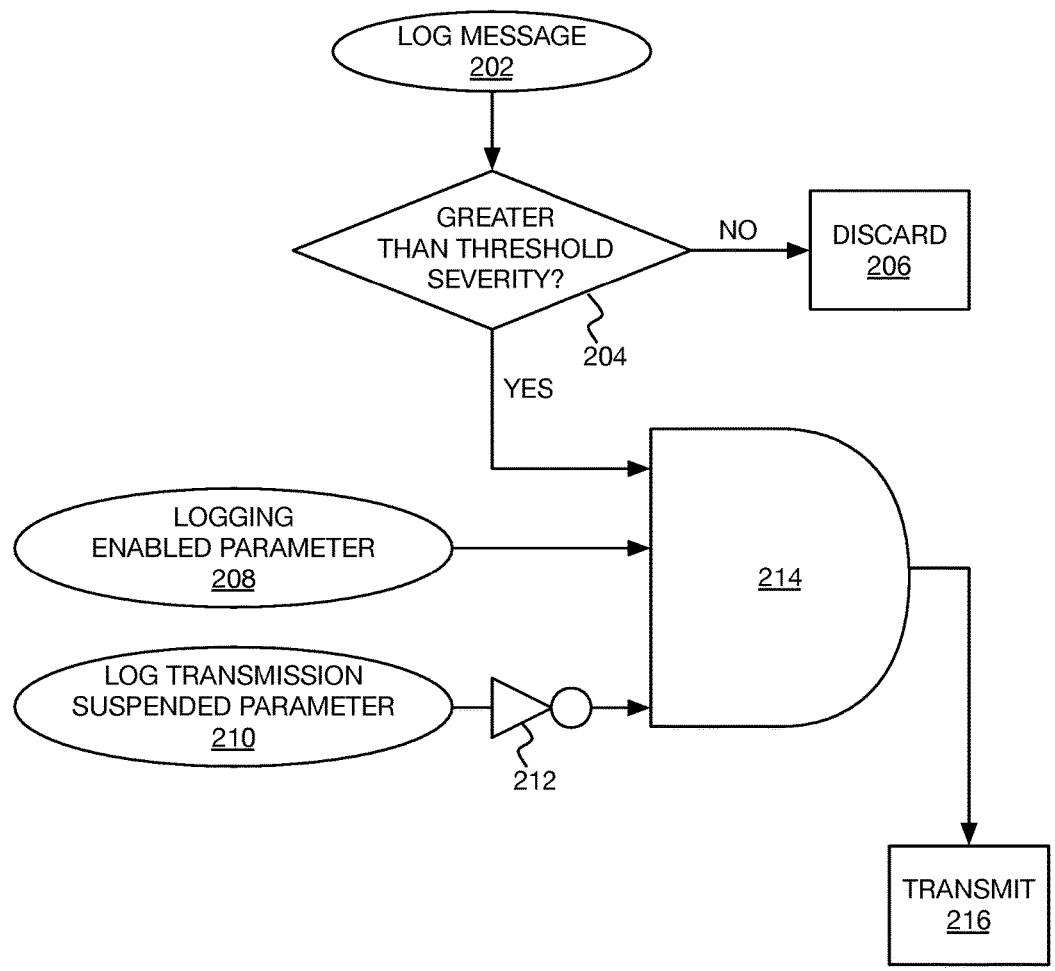
FIG. 2 is a diagram illustratively depicting example logical operation as to whether a log message is transmitted by a host device to a terminal device over a management channel.

FIG. 2 illustratively depicts example logical operation as to whether a log message is transmitted by a host device to a terminal device over a management channel. The example logical operation of FIG. 2 is on a per-management channel basis. A log message 202 is generated. If the log message does not have a severity greater than a threshold severity by which the management channel in question has been configured (204), then the message is discarded (206) with respect to the management channel, and is not transmitted to the terminal device over this channel. However, if the log message has a severity greater than the threshold severity (204), then the result is a logic one or true condition being input to a logical AND gate 214 that has three such inputs.

The second input to the logical AND gate 214 is a parameter 208 of the management channel in question as to whether logging has been enabled. The logging enabled parameter 208 can be true or logic one, corresponding to the management channel being configured so that message logging over the channel is enabled. The logging enabled parameter 208 can otherwise be false or logic zero, corresponding to the management channel being configured so that message logging over the channel is not enabled (i.e., is disabled).

The third input to the logical AND gate 214 is an output of a logical NOT gate 212. The logical NOT gate 212 has as its input a parameter 210 of the management channel in question as to whether log transmission has been suspended. The log transmission suspension parameter 210 can be true or logic one, corresponding to the management channel being configured so that log transmission over the channel is suspended. In this case, the output of the logical NOT gate 212 is false or logic zero. The log transmission suspension parameter 210 can otherwise be false or logic zero, corresponding to the management channel being configured so that log transmission over the channel is not suspended. In this case, the output of the logical NOT gate 212 is true or logic one.

If the output of the logical AND gate 214 is true, then (and only then) may the log message 202 be transmitted over the management channel in question to the terminal device (216). Therefore, transmission of the log message 202 occurs when the log message 202 has a severity greater than the threshold severity, logging over the management channel has been enabled, and log transmission over the management channel has not been suspended. It is noted that the parameters 208 and 210 are separate and independent of one another. For example, logging can be enabled for the management channel, but still be temporarily suspended.

Figure 3:
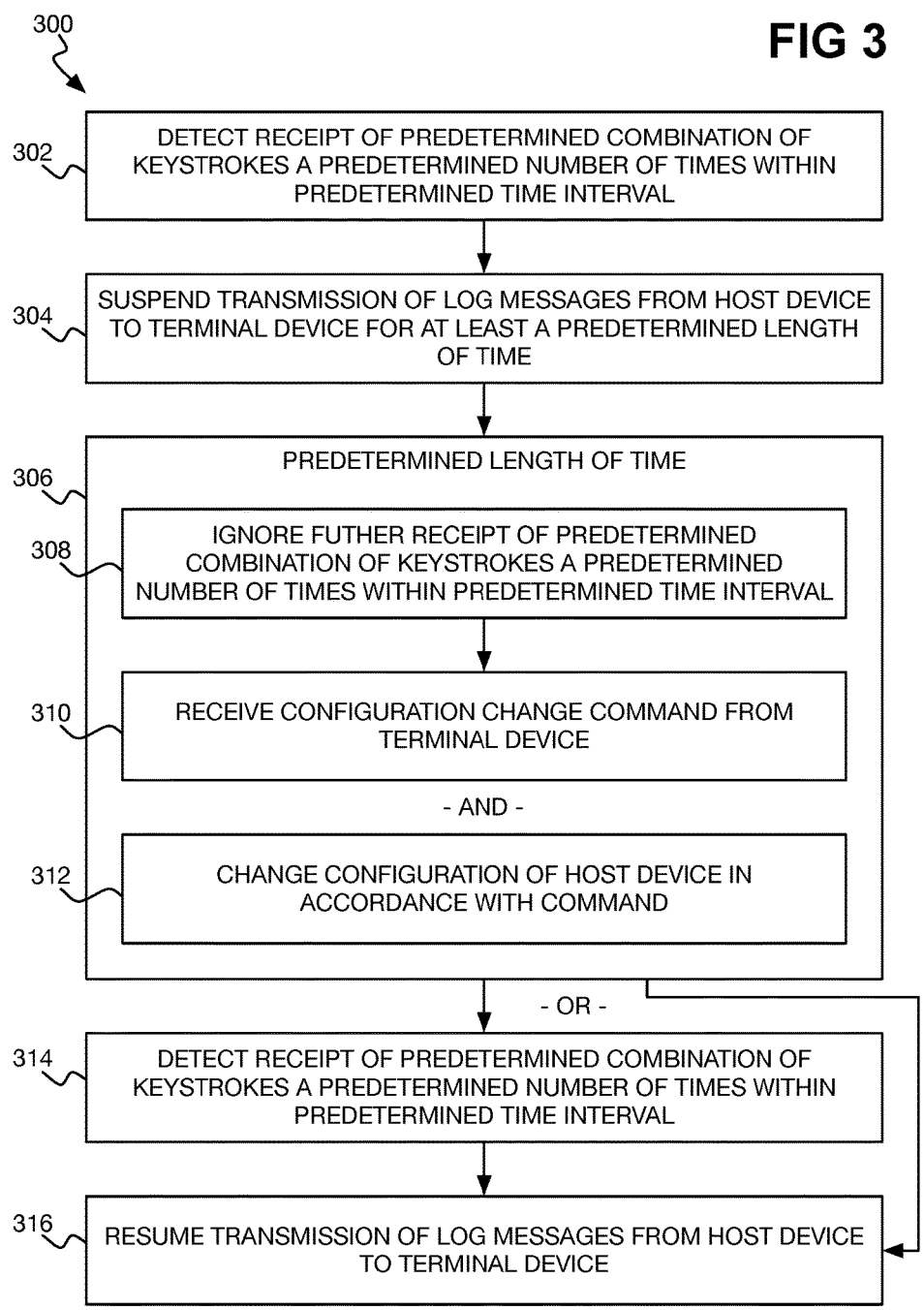
FIG. 3 is a flowchart of an example method for suspending log message transmission from a host device to a terminal device over a management channel.

FIG. 3 shows an example method 300 for temporarily suspending log message transmission from a host device to a terminal device over a management channel. The method 300 may be implemented as the computer-executable code 106 stored on the non-transitory computer-readable medium 104 for execution by the processor 102 of the host device 100 of FIG. 1. By temporarily suspending log message transmission, log message flooding can be ameliorated, permitting a user to more easily enter configuration change commands, for instance, to resolve the issue that is causing the flooding.

The host device detects receipt of a predetermined combination of keystrokes a predetermined number of times within a predetermined time interval (302), from the terminal device over the management channel. That is, a user enters on a keyboard or other input device of the terminal device the predetermined combination of keystrokes the predetermined number of times within the predetermined time interval, which is transmitted from the terminal device over the management channel to the host device, at which this input is received. The predetermined combination of keystrokes may be a predetermined combination of two or more keystrokes, such as CTRL-C in one implementation. The predetermined number of times may be two or more times, such as three times in one implementation. The predetermined time interval may be measurable in seconds, such as three seconds in one implementation.

In response, the host device suspends transmission of log messages to the terminal device over the management channel at which the keystrokes have been received in part 302, for at least a predetermined length of time (304). For instance, in one implementation, this is achieved by setting the log transmission suspended parameter 210 of FIG. 2 to logic one or true. In one implementation, the predetermined length of time can be sixty seconds.

During the predetermined length of time (306), therefore, the host device does not transmit any log messages to the terminal device over the management channel in question. The host device suspends such transmission even if, for instance, the logging enabled parameter 208 of FIG. 2 has been set to logic one or true. Similarly, the host device suspends such transmission even if for a particular log message in question generated during the predetermined length of time, the message has a severity greater than the severity threshold for which the management channel of the host device has been configured.

During the predetermined length of time (306), the host device may ignore further receipt of the predetermined combination of keystrokes the predetermined number of times within the predetermined time interval (308). That is, receipt of the predetermined combination of keystrokes the predetermined number of times within the predetermined time interval during the predetermined length of time does not result in the host device performing any action in response. This can ensure, for instance, that the user does not accidentally cause log message transmission to resume prematurely, when the same combination of keystrokes entered the same number of times within the same time interval is also used to trigger resumption of log message transmission.

During the predetermined length of time (306), the host device may receive a configuration change command from the terminal device over the management channel (310), and responsively change a configuration of the host device in accordance with the command (312). Receipt of such commands may be received in theory while log message flooding is occurring, but in practice the accurate entry of such commands at the terminal device by the user is difficult at best. Thus, by suspending the transmission of log messages to the terminal device during the predetermined length of time, the host device not only prevents log message flooding for at least this length of time, it promotes or eases entry of a configuration change command at the terminal device to resolve the issue causing log message flooding from the host device.

Once the predetermined length of time has elapsed (306), in one implementation transmission of log messages from the host device to the terminal device resumes immediately and automatically (316). That is, the method 300 proceeds directly from part 306 to part 316. In another implementation, however, transmission of log messages from the host device to the terminal device over the management channel does not resume automatically. Rather, the host device in this implementation first detects another receipt of the predetermined combination of keystrokes the predetermined number of times within the predetermined time interval (314), and in response just then resumes transmission of log messages as they are generated (316).

The log messages generated during the predetermined length of time may not be queued for later or subsequent transmission to the terminal device over the management channel once the predetermined length of time has elapsed. Rather, they can be discarded, or saved in a file so that no log messages are lost. Once the predetermined length of time has elapsed, log message transmission to the terminal device resumes (automatically or manually by user interaction). For instance, this can mean that log messages generated after the predetermined length of time has elapsed are transmitted from the host device to the terminal device over the management channel. Not transmitting the log messages generated during the predetermined length of time to the terminal device after the predetermined length of time has occurred, instead of transmitting them to the terminal device later after the predetermined length of time has occurred, can ensure that once log message transmission resumes, the terminal device is not even temporarily flooded with log messages. Such temporary flooding may otherwise lead the user at the terminal device question whether he or she has resolved the underlying issue causing the flooding.

Figure 4:
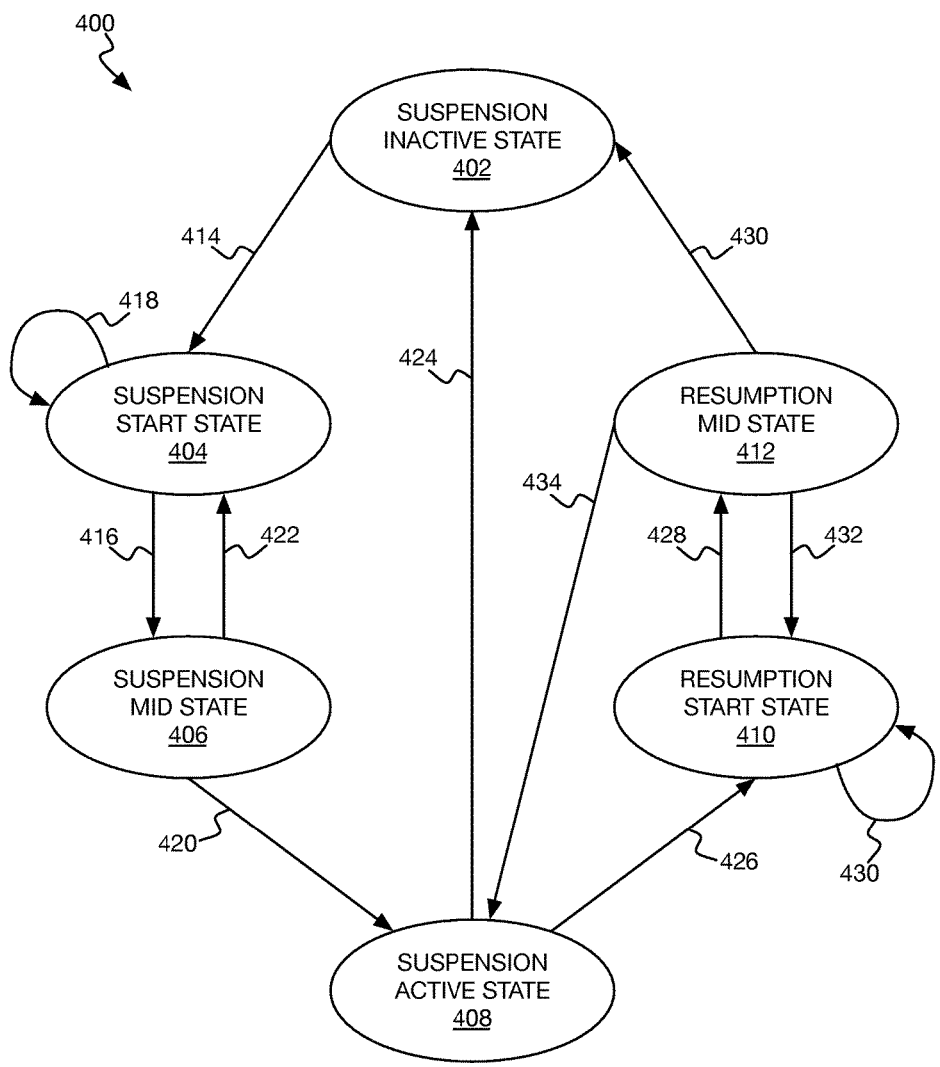
FIG. 4 is a diagram of a finite state machine that can be employed to suspend and subsequently resume log message transmission from a host device to a terminal device over a management channel.

FIG. 4 shows an example finite state machine 400 that a host device can use to detect the receipt of the predetermined combination of keystrokes the predetermined number of times within the predetermined time interval in part 302 of the method 300 before suspending transmission of log messages in part 304. The host device can also use the finite state machine 400 to detect further receipt of the predetermined combination of keystrokes the predetermined number of times within the time interval in part 314 of the method 300 as a prerequisite for resuming transmission of log messages in part 316, or to automatically resume transmission of log messages in part 316. For clarity of explanation, the finite state machine 400 is described in relation to the predetermined time interval being three seconds, and the minimum predetermined length of time in which log message transmission is suspended being sixty seconds. Because there is a minimum of three transitions between states 402 and 408, the predetermined number of times in the finite state machine 400 is three times.

The finite state machine 400 starts at a log message transmission suspension inactive state 402. In the suspension inactive state 402, log messages are transmitted from the host device to the terminal device. The suspension inactive state 402 transitions to a log message transmission suspension start state 404 along an edge 414. The edge 414 corresponds to detecting the predetermined combination of keystrokes over the management channel from the terminal device. In the suspension start state 404, a start time is set equal to the time in which the predetermined combination of keystrokes corresponding to the edge 414 was received.

The suspension start state 404 can transition to a log message transmission suspension mid state 406 along an edge 416. The edge 416 corresponds to detecting the predetermined combination of keystrokes over the management channel from the terminal device in less than three seconds from the start time. The suspension start state 404 can also transition back to itself along an edge 418. The edge 418 corresponds to detecting the predetermined combination of keystrokes over the management channel from the terminal device in more than three seconds from the start time. The start time is thus reset to when the predetermined combination of keystrokes corresponding to the edge 418 was received.

The suspension mid state 406 can transition to a log message transmission suspension active state 408 along an edge 420. The edge 420 corresponds to detecting the predetermined combination of keystrokes over the management channel from the terminal device in less than three seconds from the start time. The suspension mid state 406 can also transition back to the suspension start state 404 along an edge 422. The edge 422 corresponds to detecting the predetermined combination of keystrokes over the management channel from the terminal device in more than three seconds from the start time. The start time is thus reset to when the predetermined combination of keystrokes corresponding to the edge 422 was received.

In the suspension active state 408, the transmission of log messages from the host device to the terminal device over the management channel is suspended. In one implementation, the suspension active state 408 can transition to the suspension inactive state 402 along an edge 424. The edge 424 corresponds to elapsing of the sixty-second length of time in which log message transmission is suspended. This implementation thus corresponds to the method 300 proceeding directly from part 306 to part 316.

In another implementation, the suspension active state 408 does not transition to the suspension inactive state 402 along the edge 424. This implementation corresponds to the method 300 first proceeding to part 314 before proceeding to part 316. As such, the suspension active state 408 can transition to a log message transmission resumption start state 410 along an edge 426. The edge 426 corresponds to detecting the predetermined combination of keystrokes over the management channel from the terminal device. In the resumption start state 410, the start time is set to the time when the predetermined combination of keystrokes corresponding to the edge 426 was received.

The resumption start state 410 can transition to a log message transmission resumption mid state 412 along an edge 428. The edge 428 corresponds to detecting the predetermined combination of keystrokes over the management channel from the terminal device in less than three seconds from the start time. The resumption start state 410 can also transition back to itself along an edge 430. The edge 430 corresponds to detecting the predetermined combination of keystrokes over the management channel from the terminal device in more than three seconds from the start time. The start time is thus reset to the time when the predetermined combination of keystrokes corresponding to the edge 430 was received.

The resumption mid state 412 can transition to the suspension inactive state 402 along an edge 430. The edge 430 corresponds to detecting the predetermined combination of keystrokes over the management channel from the terminal device in less than three seconds from the start time, and if the time this predetermined combination of keystrokes was detected is more than sixty seconds after the suspension mid state 406 transitioned to the suspension active state 408 along the edge 420. In the suspension inactive state 402, log message transmission from the host device to the terminal device over the management channel is resumed (that is, the suspension thereof is inactive).

The resumption mid state 412 can further transition back to the resumption start state 410 along an edge 432. The edge 432 corresponds to detecting the predetermined combination of keystrokes over the management channel from the terminal device in more than three seconds from the start time, and if the time this predetermined combination of keystrokes was detected is more than sixty seconds after the suspension mid state 406 transitioned to the suspension active state 408 along the edge 420. Finally, the resumption mid state 412 can transition back to the suspension active state 408 along an edge 434. The edge 434 corresponds to detecting the predetermined combination of keystrokes over the management channel from the terminal device, if the time this predetermined combination of keystrokes was detected is less than sixty seconds after the suspension mid state 406 transitioned to the suspension active state 408 along the edge 420.

The finite state machine 400 is thus one manner by which the receipt of the predetermined combination of keystrokes can be detected the predetermined number of times within the predetermined time interval as a condition in part 302 of the method 300 to proceed to part 304. The finite state machine 400 is similarly one manner by which the receipt of the predetermined combination of keystrokes can be detected the predetermined number of times within the predetermined time interval as a condition in part 314 of the method 300 to proceed to part 316. The finite state machine 400 as depicted in FIG. 4 also illustrates, via the edge 424, automatic procession in the method 300 from part 306 to part 316, without first performing part 314, upon the elapsing of the predetermined length of time.

The techniques that have been disclosed can promote user entry of a configuration change command at a terminal device for receipt and performance by a host device to resolve log message flooding of the management channel between the host device and the terminal device. This is achieved by suspending log message transmission from the host device to the terminal device. With log message transmission suspended, a user is able to at least more easily enter commands like configuration change commands at a terminal device to fix the underlying issue that is causing the log message flooding. The user does not have to employ a different management channel than that on which log message flooding is occurring—if such a different channel is even available—and further does not have to reboot or reimage the host device.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:
1. A method comprising:
flooding, by a host device, log messages to a terminal device directly connected as a dumb terminal to the host device over a send-and-receive text teletype (TT) management channel in which the terminal device is to display the log messages in-between keystrokes enterable by a user, wherein display of the log messages in-between keystrokes enterable by the user impairs readability of a command formed by the keystrokes;
detecting, by the host device, receipt of a predetermined combination of simultaneously pressed keystrokes a predetermined number of times within a predetermined time interval from the terminal device; and
in response to detecting the receipt of the predetermined combination of keystrokes the predetermined number of times within the predetermined time interval, suspending, by the host device, transmission of log messages from the host device to the terminal device for at least a predetermined length of time, improving a capability of the terminal device to manage the host device by increasing readability of the keystrokes enterable by the user at the terminal device.

2. The method of claim 1, further comprising, after suspending the transmission of log messages from the host device to the terminal device:
   upon the predetermined length of time having elapsed, automatically resuming, by the host device, the transmission of log messages from the host device to the terminal device.

3. The method of claim 1, further comprising, after suspending the transmission of log messages from the host device to the terminal device:
   upon the predetermined length of time having elapsed, detecting, by the host device, further receipt of the predetermined combination of keystrokes the predetermined number of times within the predetermined time interval, from the terminal device;
   in response to detecting the further receipt of the predetermined combination of keystrokes the predetermined number of times within the predetermined time interval, resuming, by the host device, the transmission of log messages from the host device to the terminal device,
   wherein until detection of the further receipt of the predetermined combination of keystrokes the predetermined number of times within the predetermined time interval, the transmission of log messages from the host device to the terminal device remains suspended after the predetermined length of time has elapsed.

4. The method of claim 1, further comprising, after suspending the transmission of the log messages from the host device to the terminal device:
   during the predetermined length of time, ignoring, by the host device, further receipt of the predetermined combination of keystrokes the predetermined number of times within the predetermined time interval, from the terminal device,
   wherein the further receipt of the predetermined combination of keystrokes the predetermined number of times within the predetermined time interval during the predetermined length of time does not result in any action at the host device.

5. The method of claim 1, further comprising, after suspending the transmission of the log messages from the host device to the terminal device:
   during the predetermined length of time, receiving, by the host device, a configuration change command from the terminal device; and
   in response to receiving the configuration change command, changing a configuration of the host device, by the host device, in accordance with the configuration change command.

6. The method of claim 1, wherein suspending the transmission of log messages from the host device to the terminal device prevents log message flooding from the host device to the terminal device for at least the predetermined length of time, and promotes entry of a configuration change command at the terminal device to resolve the log message flooding from the host device.

7. The method of claim 1, wherein detecting the receipt of the predetermined combination of keystrokes the predetermined number of times within the predetermined time interval comprises:
   starting at a log message transmission suspension inactive state of a finite state machine, transitioning to a log message transmission suspension start state of the finite state machine responsive to first receipt of the predetermined combination of keystrokes and setting a start time equal to a time of the first receipt;
   from the log message transmission suspension start state, transitioning to a log message transmission suspension mid state of the finite statement machine responsive to second receipt of the predetermined combination of keystrokes if a time of the second receipt minus the start time is less than the predetermined time interval;
   from the log message transmission suspension start state, transitioning back to the log message transmission suspension start state and setting the start time equal to the time of the second receipt responsive to the second receipt of the predetermined combination of keystrokes if the time of the second receipt minus the start time is greater than the predetermined time interval;
   from the log message transmission suspension mid state, transitioning to a log message transmission suspension active state of the finite state machine responsive to receipt to third receipt of the predetermined combination of keystrokes if a time of the third receipt minus the start time is less than the predetermined time interval; and
   from the log message transmission suspension mid state, transitioning back to the log message transmission suspension start state and setting the start time equal to the time of the third receipt responsive to the third receipt of the predetermined combination of keystrokes if the time of the third receipt minus the start time is greater than the predetermined time interval.

8. The method of claim 7, further comprising, after suspending the transmission of log messages from the host device to the terminal device:
   upon the predetermined length of time having elapsed, detecting, by the host device, further receipt of the predetermined combination of keystrokes the predetermined number of times within the predetermined time interval, from the terminal device;
   in response to detecting the further receipt of the predetermined combination of keystrokes the predetermined number of times within the predetermined time interval, resuming, by the host device, the transmission of log messages from the host device to the terminal device,
   wherein until detection of the further receipt of the predetermined combination of keystrokes the predetermined number of times within the predetermined time interval, the transmission of log messages from the host device to the terminal device remains suspended after the predetermined length of time has elapsed,
   and wherein upon the predetermined length of time having elapsed, detecting the further receipt of the predetermined combination of keystrokes the predetermined number of time within the predetermined time interval comprises:
      from the log message transmission suspension active state, transitioning to a log message transmission resumption start state of the finite state machine responsive to fourth receipt of the predetermined combination of keystrokes and setting the start time equal to a time of the fourth receipt;
      from the log message transmission resumption start state, transitioning to a log message transmission resumption mid state of the finite statement machine responsive to fifth receipt of the predetermined combination of keystrokes if a time of the fifth receipt minus the start time is less than the predetermined time interval;
      from the log message transmission resumption start state, transmitting back to the log message transmission resumption start state and setting the start time equal to the time of the fifth receipt responsive to the fifth receipt of the predetermined combination of keystrokes if the time of the fifth receipt minus the start time is greater than the predetermined time interval;

from the log message transmission resumption mid state, transitioning to the log message transmission suspension inactive state responsive to sixth receipt of the predetermined combination of keystrokes if a time of the sixth receipt minus the start time is less than the predetermined time interval and if the time of the sixth receipt minus the time of the third receipt is greater than the predetermined length of time;

from the log message transmission resumption mid state, transitioning back to the log message transmission resumption start state and setting the start time equal to the time of the sixth receipt responsive to the sixth receipt of the predetermined combination of keystrokes if the time of the sixth receipt minus the start time is greater than the predetermined time interval and if the time of the sixth receipt minus the time of the third receipt is greater than the predetermined length of time; and from the log message transmission resumption mid state, transitioning back to the log message transmission suspension active state responsive to the sixth receipt of the predetermined combination of keystrokes if the time of the sixth receipt minus the time of the third receipt is less than the predetermined length of time.

9. A host device comprising:

a communication interface to establish a management channel with a terminal device over which the terminal device is directly connected to the host device to manage the host device, the communication interface being a direct communication interface to establish a send-and-receive text teletype (TTY) management channel with the terminal device over which the terminal device is to manage the host device as a dumb terminal for the host device;

a processor;

a non-transitory computer-readable data storage medium storing computer-executable code that the processor executes to:

transmit any log message generated at the host device to the terminal device over the management channel if the any log message has a severity greater than a threshold severity, if logging over the management channel is enabled, and if log message transmission over the management channel has not been suspended;

flood the terminal device with log messages that the terminal display devices in-between keystrokes enterable by a user at the terminal device, wherein display of the log messages in-between keystrokes enterable by the user impairs readability of a command formed by the keystrokes;

in response to receiving a predetermined combination of simultaneously pressed keystrokes a predetermined number of times within a predetermined interval from the terminal device, suspend the log message transmission over the management channel for at least a predetermined length of time, improving a capability of the terminal device to manage the host device by increasing the readability of the keystrokes enterable by the user at the terminal device, wherein enablement and disablement of the logging over the management channel is separately controllable from suspension and resumption of the log message transmission over the management channel.

10. The host device of claim 9, further comprising:

an indirect communication interface to establish a virtual TTY (VTY) management channel with the terminal device over which the terminal device is to manage the host device, the VTY management channel independent of the TTY management channel, wherein suspending transmission of the log messages to the terminal device over the TTY management channel for at least the predetermined length of time does not suspend any transmission of the log messages over the VTY management channel.

11. The host device of claim 9, wherein the processor executes the code to further, after suspending the transmission of the log messages to the terminal device over the management channel:

upon the predetermined length of time having elapsed, automatically resume the transmission of the log messages to the terminal device over the management channel.

12. The host device of claim 9, wherein the processor executes the code to further, after suspending the transmission of the log messages to the terminal device over the management channel:

upon the predetermined length of time having elapsed, further receive the predetermined combination of keystrokes the predetermined number of times within the predetermined time interval from the terminal device over the management channel;

in response to further receiving the predetermined combination of keystrokes the predetermined number of times within the predetermined time interval, resume the transmission of log messages from the host device to the terminal device over the management channel, wherein until further receipt of the predetermined combination of keystrokes the predetermined number of times within the predetermined time interval, the transmission of log messages to the terminal device over the management channel remains suspended after the predetermined length of time has elapsed.

13. The host device of claim 9, wherein the processor executes the code to further, after suspending the transmission of the log messages to the terminal device over the management channel:

during the predetermined length of time, ignore further receipt of the predetermined combination of keystrokes the predetermined number of times within the predetermined time interval from the terminal device over the management channel, wherein the further receipt of the predetermined combination of keystrokes the predetermined number of times within the predetermined time interval during the predetermined length of time does not result in any action at the host device.

14. The host device of claim 9, wherein the processor executes the code to further, after suspending the transmission of the log messages to the terminal device over the management channel:

during the predetermined length of time, receive a configuration change command from the terminal device; and in response to receiving the configuration change command, change a configuration of the host device in accordance with the configuration change command.

15. The host device of claim 9, wherein suspending the transmission of log messages from the host device to the terminal device over the management channel prevents log message flooding of the management channel from the host device to the terminal device for at least the predetermined length of time, and promotes entry of a configuration change command at the terminal device via the management channel to resolve the log message flooding from the host device.

16. A non-transitory computer-readable data storage medium storing computer-executable code that a host device executes to:

flood log messages to a terminal device directly connected as a dumb terminal to the host device over a send-and-receive text teletype (TT) management channel in which the terminal device is to display the log messages in-between keystrokes enterable by a user, wherein display of the log messages in-between keystrokes enterable by the user impairs readability of a command formed by the keystrokes;

receive a predetermined combination of simultaneously pressed keystrokes a predetermined number of times within a predetermined time interval, from the terminal device;

in response to receiving the predetermined combination of keystrokes the predetermined number of times within the predetermined time interval, suspend transmission of log messages from the host device to the terminal device for at least a predetermined length of time, improving a capability of the terminal device to manage the host device by increasing the readability of the keystrokes enterable by the user at the terminal device;

after the predetermined length of time has elapsed, further receive of the predetermined combination of keystrokes the predetermined number of times within the predetermined time interval, from the terminal device; and in response to further receiving the predetermined combination of keystrokes the predetermined number of times within the predetermined time interval, resume the transmission of log messages from the host device to the terminal device, wherein until detection of the further receipt of the predetermined combination of keystrokes the predetermined number of times within the predetermined time interval, the transmission of log messages from the host device to the terminal device remains suspended after the predetermined length of time has elapsed.

17. The non-transitory computer-readable data storage medium of claim 16, wherein the host device further executes the code to, after suspending the transmission of the log messages from the host device to the terminal device:

during the predetermined length of time, receive a configuration change command from the terminal device; and in response to receiving the configuration change command, change a configuration of the host device in accordance with the configuration change command.

18. The non-transitory computer-readable data storage medium of claim 16, wherein suspending the transmission of log messages from the host device to the terminal device prevents log message flooding from the host device to the terminal device for at least the predetermined length of time, and promotes entry of a configuration change command at the terminal device to resolve the log message flooding from the host device.

\* \* \* \* \*